United States Patent
Yamamoto et al.

(10) Patent No.: US 8,930,084 B2
(45) Date of Patent: Jan. 6, 2015

(54) SEAT WEIGHT DETECTING SUBSYSTEM

(75) Inventors: Masataka Yamamoto, Shizuoka (JP); Masayuki Kondo, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 433 days.

(21) Appl. No.: 13/201,891

(22) PCT Filed: Aug. 31, 2010

(86) PCT No.: PCT/JP2010/064826
§ 371 (c)(1),
(2), (4) Date: Aug. 17, 2011

(87) PCT Pub. No.: WO2011/025038
PCT Pub. Date: Mar. 3, 2011

(65) Prior Publication Data
US 2011/0301782 A1 Dec. 8, 2011

(30) Foreign Application Priority Data
Aug. 31, 2009 (JP) ................. 2009-199179

(51) Int. Cl.
*B60R 22/00* (2006.01)
*E05F 15/00* (2006.01)
*G05D 1/00* (2006.01)
*G05D 3/00* (2006.01)
*G06F 7/00* (2006.01)
*G06F 17/00* (2006.01)
*B60R 21/015* (2006.01)
*B60N 2/00* (2006.01)
*G01G 19/414* (2006.01)

(52) U.S. Cl.
CPC .......... *B60R 21/015* (2013.01); *B60N 2/002* (2013.01); *G01G 19/4142* (2013.01)
USPC ........................................... 701/45

(58) Field of Classification Search
USPC ........ 701/1, 45; 439/76.1; 180/268, 271, 273, 180/282; 280/735, 801.1; 340/667
See application file for complete search history.

(56) References Cited

U.S. PATENT DOCUMENTS 6,242,701 B1 * 6/2001 Breed et al. .................. 177/144
7,555,960 B2 * 7/2009 Nakano et al. ................. 73/781
(Continued)

FOREIGN PATENT DOCUMENTS

| EP | 1063134 A1 * | 12/2000 | ............. B60R 16/02 |
|---|---|---|---|
| JP | 2001-124860 A | 5/2001 | |
| JP | 2003-042866 A | 2/2003 | |
| JP | 2006-256597 A | 9/2006 | |

OTHER PUBLICATIONS

Extended European Search Report dated Jan. 28, 2013, issued by the European Patent Office in counterpart European Application No. 10812084.1.

(Continued)

*Primary Examiner* — Khoi Tran
*Assistant Examiner* — Jaime Figueroa
(74) *Attorney, Agent, or Firm* — Sughrue Mion, PLLC

(57) ABSTRACT

It is provided a subsystem for seat weight detection, the configuration of which enables improved assemblability and economization of space in layout. A seat weight detecting subsystem is provided for each seat 7 mounted inside a vehicle. Each seat weight detecting subsystem 4 includes weight detection sensors 8 which are installed in a seat 7, and a power supplying member 9 which is connected to the weight detecting sensors 8, a power supply 5, an ECU 3 and the like. The power supplying member 9 is provided with an FPC 10 and a seat side ECU functional portion 11 that is integratedly attached to the FPC 10. The seat-side ECU functional portion 11 includes sensor connecting sections 13, a signal receiving section 14, a data generating section 15, and a data outputting section 16.

3 Claims, 3 Drawing Sheets

(56) References Cited

U.S. PATENT DOCUMENTS

| | | | |
|---|---|---|---|
| 2002/0134167 A1* | 9/2002 | Rainey et al. | 73/795 |
| 2002/0195807 A1* | 12/2002 | Ishida | 280/735 |
| 2003/0020593 A1* | 1/2003 | Ito et al. | 338/114 |
| 2003/0060957 A1* | 3/2003 | Okamura et al. | 701/45 |
| 2005/0023065 A1* | 2/2005 | McBride et al. | 180/273 |
| 2005/0093276 A1* | 5/2005 | Hayes et al. | 280/735 |
| 2006/0076164 A1* | 4/2006 | Nishio | 177/136 |
| 2006/0144630 A1* | 7/2006 | Breed et al. | 180/273 |
| 2006/0180376 A1 | 8/2006 | Kobayashi et al. | |
| 2006/0185446 A1* | 8/2006 | Speckhart | 73/862.391 |
| 2007/0173083 A1 | 7/2007 | Kopplin | |
| 2008/0036185 A1* | 2/2008 | Breed | 280/734 |
| 2008/0127752 A1* | 6/2008 | Nakano et al. | 73/862.627 |
| 2009/0027221 A1* | 1/2009 | Plocher | 340/667 |

OTHER PUBLICATIONS

International Search Report issued in PCT/JP2010/064826 on Nov. 30, 2010.

Office Action dated Nov. 12, 2013, issued by the Japan Patent Office in corresponding Japanese Application No. 2009-199179.

* cited by examiner

SEAT WEIGHT DETECTING SUBSYSTEM

TECHNICAL FIELD

The present invention relates to a seat weight detecting subsystem, which is provided for each seat mounted inside a vehicle and having a plurality of weight detecting sensors, and outputs weight detection data which is necessary for processing operations of an ECU (Electronic Control Unit) of a main system.

BACKGROUND ART

Recently, in order to improve the safety of vehicle occupants, many systems have been proposed. Those systems include, for example, a system for determining whether an occupant seated on a seat is an adult based on the weight of the occupant, and a system that enables the actuation of an air bag or the retention of a seat belt to be satisfactorily performed based on the weight of the occupant seated on the seat.

For example, a system disclosed in the below-mentioned patent document 1 has weight detecting sensors respectively provided at four supporting leg portions that support a vehicle seat, an electronic control unit which includes a determining circuit that determines whether or not an occupant is an adult based on the signals from the weight detecting sensors, and an air bag electronic control unit which is connected to the electronic control unit. The weight detecting sensors and the electronic control unit are connected by a wire harness which is configured by a predetermined number of electric wires. Since four weight detecting sensors are provided for each seat, many wire harnesses (electric wires) are connected to the electronic control unit.

PRIOR ART DOCUMENTS

Patent Document

Patent Document 1 JP Patent Document No. 2006-256597

SUMMARY OF THE INVENTION

Problems to be Solved by the Invention

However, in the above prior art, since a large number of wire harnesses are connected, and the number of electric wires also increases, the working man-hours for each seat adversely increase. As a result, there are such problems as influences on cost and working efficiency. In addition, since the number of electric wires increases, which makes the electric wires thicker, it is a problem to ensure that enough space inside the seat and the like is allocated to the wires.

In view of the above-mentioned problems, the object of the invention is to provide a seat weight detecting subsystem that makes it possible to improve assembly efficiency and save the space allotted to the wires.

In order to achieve the above object, according to the present invention, there is provided a seat weight detecting subsystem provided for each seat in a vehicle and for outputting weight detection data which is necessary for a processing operation of an ECU in a main system, the seat weight detecting subsystem comprising:

a plurality of weight detecting sensors; and
a power supplying member that is connected to a power supply,
wherein the power supplying member includes:
a FPC which has circuits forming desired routes, and is formed so as to have a size which corresponds to at least arrangements of all of the plurality of weight detecting sensors on the seat in the vehicle; and
a seat side ECU functional portion having:
sensor connecting sections which serve as connecting portions of the plurality of weight detecting sensors at the corresponding arrangements;
a signal receiving section which receives sensor signals from the weight detecting sensors through the sensor connecting sections;
a data generating section which generates the weight detection data based on the received sensor signals; and
a data outputting section as a portion which outputs the generated weight detection data to the ECU; and
wherein the seat side ECU functional portion is mounted to a specified position on the circuits of the FPC.

Also, in the above described seat weight detecting subsystem, the seat side ECU functional portion includes: a plurality of first ECU functional portions provided as many as the number of the plurality of weight detecting sensors; and a second ECU functional portion connected to the plurality of first ECU functional portions through a common circuit in the FPC. The signal receiving section includes: a second signal receiving section provided in the second ECU functional portion; and first signal receiving sections which are respectively provided in the plurality of first ECU functional portions and output the received sensor signals to the second signal receiving section through the common circuit while associating the received sensor signals to the weight detecting sensors at the corresponding arrangements. The first ECU functional portion includes the sensor connecting sections and the first signal receiving section. The second ECU functional portion includes the second signal receiving section, the data generating section and the data outputting section. The FPC includes the common circuit.

According to the present invention characterized in above features, the main system includes a plurality of seat weight detecting subsystems, and the weight detection data for each of the seats are gathered in the ECU of the main system by the seat weight detecting subsystems. The ECU of the main system executes specified processing operations based on the weight detection data. The result of the processing operations is used, for example, when an air bag is actuated. The seat weight detecting subsystem includes the power supplying member, and the functions of the ECU that are exclusive to the seat are added to the power supplying member. The power supplying member includes the seat side ECU functional portion which has the functions of the ECU that are exclusive to the seat, and the FPC (Flexible Printed Circuits) whose size corresponds to all the plurality of weight detecting sensors, and integrates the seat side ECU functional portion and the FPC by mounting the seat side ECU functional portion to the FPC. According to this invention, by assembling the power supplying member to the plurality of weight detecting sensors, the assembly operation of the seat weight detecting subsystem is completed. Since the power supplying member has the FPC, the seat weight detecting subsystem becomes thinner. In the present invention, if the FPC is configured to have the common circuit, the number of circuits in the FPC becomes less. Therefore, the seat weight detecting subsystem becomes thinner and narrower.

Effects of the Invention

According to the present invention, since the power supplying member is included in the configuration of the system by mounting the seat side ECU functional portion to the FPC, the effect of improving the assembly efficiency and saving wire allotting space can be obtained.

In addition, according to the present invention, by means of the configuration of the seat side ECU functional portion and the configuration of the FPC, the effect of further saving space can be obtained.

DESCRIPTION OF EMBODIMENTS

A seat weight detecting subsystem includes a power supplying member, and the functions of an ECU that are exclusive to a seat are added to the power supplying member. In particular, the power supplying member has a FPC, and a seat side ECU functional portion is provided on a specified position in a circuit of the FPC.

Embodiment 1

Figure 1:
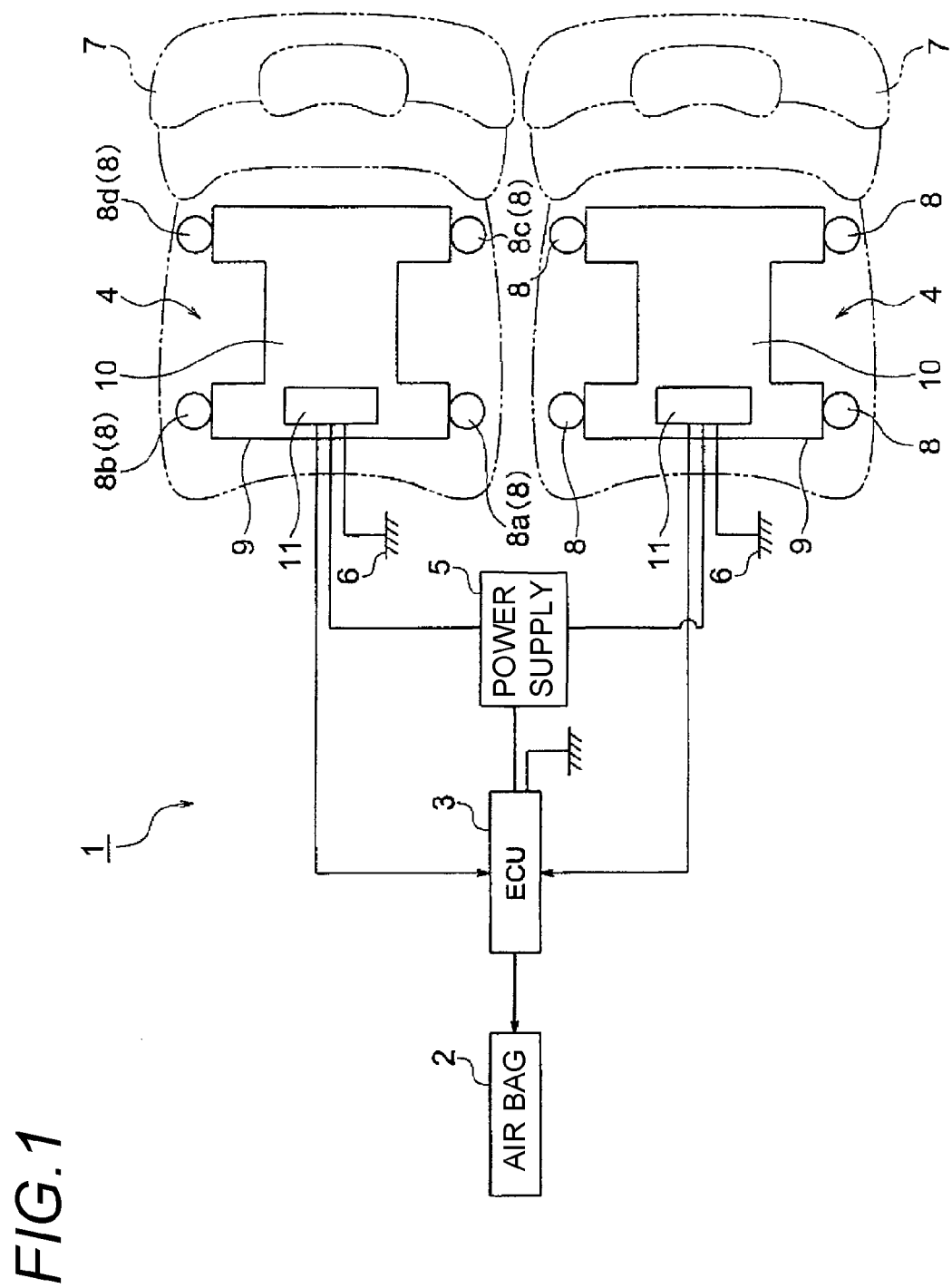
FIG. 1 is a schematic diagram of a whole system which includes a seat weight detecting subsystems of the present invention (Embodiment 1).
Figure 2:
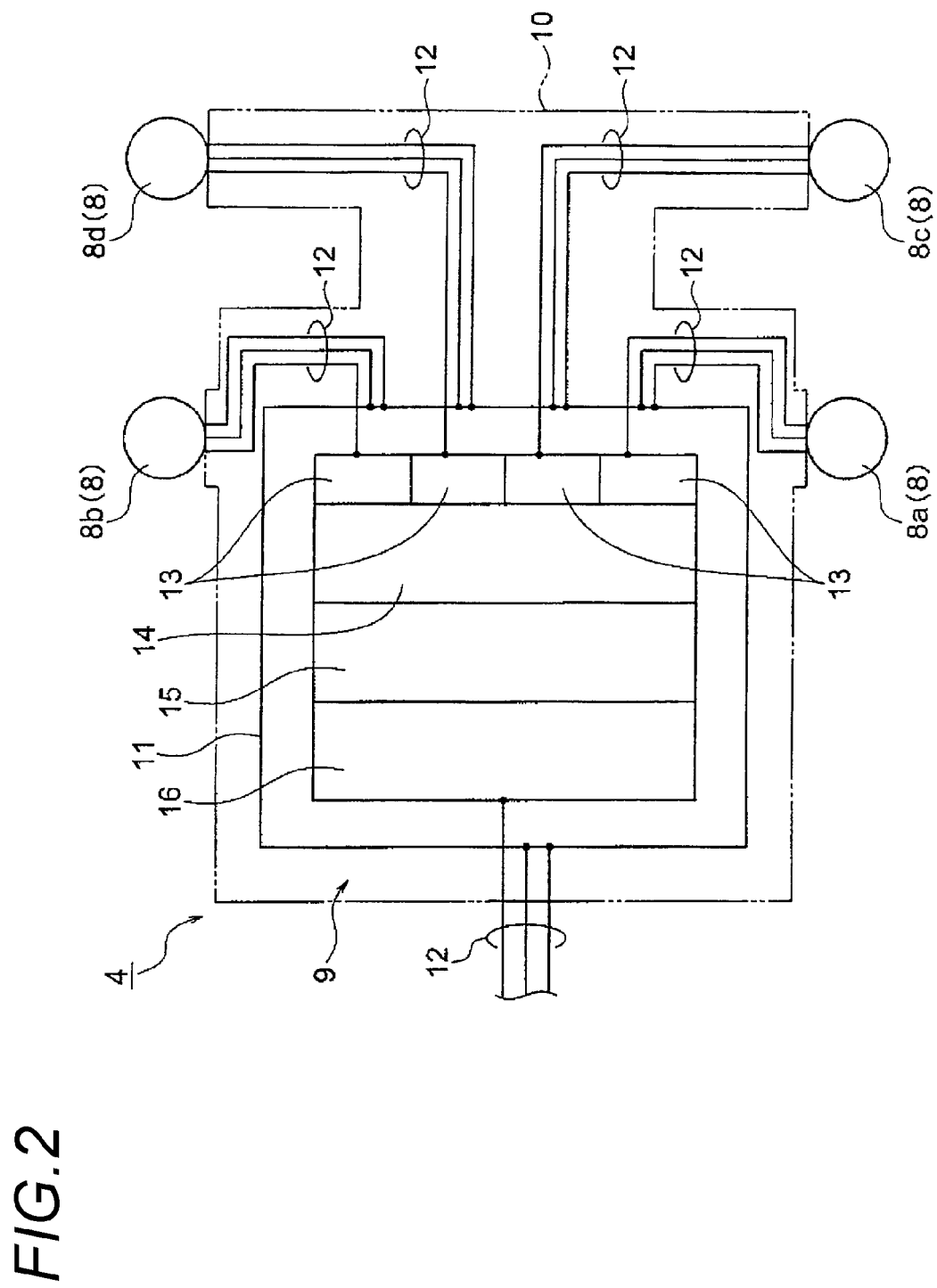
FIG. 2 is a schematic block diagram of the seat weight detecting subsystem of FIG. 1.

Below, the first embodiment will be described with reference to the figures. FIG. 1 is a schematic diagram of a whole system which includes the seat weight detecting subsystems of the present invention. In addition, FIG. 2 is a schematic block diagram of the seat weight detecting subsystem of FIG. 1.

In FIG. 1, a main system indicated as the reference number 1 is, for example, a system related to control of an air bag 2. The main system includes an ECU (Electronic Control Unit) 3 for controlling the air bag 2 and a plurality of seat weight detecting subsystems 4 which are connected to the ECU 3. The seat weight detecting subsystem 4 is configured to be able to output weight detection data which is necessary for the processing operation of the ECU 3. The reference number 5 indicates a power supply which supplies power to the main system 1 and the seat weight detecting subsystems 4. In addition, the reference number 6 indicates ground.

The seat weight detecting subsystem 4 is provided for each seat 7 mounted in a vehicle (vehicle seat). The seat weight detecting subsystem 4 includes weight detecting sensors 8 which are provided respectively at four supporting leg portions (the illustrations of which are omitted) that support the seat 7, and a power supplying member 9 which is connected to the weight detecting sensors 8, the power supply 5, the ECU 3, etc. The seat weight detecting subsystem 4 is configured to be able to detect the weight of an occupant seated on the seat 7.

The weight detecting sensor 8 is a so-called load sensor which includes a strain detecting element such as a strain gauge. The weight detecting sensor 8 is able to electrically detect the deflecting amount of a deflection portion which corresponds to the weight (load) of an occupant on a cushion of the seat 7. The reference number 8a indicates a weight detecting sensor that is mounted at a frontal left side, the reference number 8b indicates a weight detecting sensor that is mounted at a frontal right side, the reference number 8c indicates a weight detecting sensor that is mounted at a rear left side, and the reference number 8d indicates a weight detecting sensor that is mounted at a rear right side, respectively.

The seat weight detecting subsystem 4 is characterized in the power supplying member 9 included therein. Below, the power supplying member 9 is described with reference to FIGS. 1 and 2.

The power supplying member 9 includes a FPC 10 and a seat side ECU functional portion 11 which is integrally mounted to the FPC 10. The FPC 10 is a well known member (flexible printed circuit board) that is thin and flexible, and has circuits 12 which form desired routes. The FPC 10 is formed to have a size that corresponds to all the four weight detecting sensors 8 provided at the seat 7 (corresponding to the arrangement of the four weight detecting sensors 8). Each of the circuits 12 is configured by a power supply line connected to the power supply 5, a GND line connected to the ground 6, and a signal line (communication line), although they are not given specific numbers. The FPC 10 is formed so as to aggregate the circuits 12 that relate to the four weight detecting sensors 8.

The seat side ECU functional portion 11 has ECU functions that are dedicated to the seat 7. In particular, the seat side ECU functional portion 11 is configured by a micro-computer which has a CPU, a RAM, a ROM, etc. The CPU can execute various processing operations in accordance with control programs, original data, etc which are stored beforehand. The seat side ECU functional portion 11 has four sensor connecting section 13, a signal receiving section 14, a data generating section 15 and a data outputting section 16.

The sensor connecting sections 13 are provided as connecting parts that correspond to the weight detecting sensors 8. The sensor connecting sections 13 are connected to the weight detecting sensors 8 through the corresponding circuits 12 respectively. Furthermore, the connecting ends of the circuits 12 are formed in accordance with the shapes of the connecting parts of the weight detecting sensors 8 (The connecting shape is not particularly limited. A connector can be an example of the connection part. It is preferred that the connecting shapes make it possible to easily assemble the power supplying member 9 to the four corresponding weight detecting sensors 8).

The signal receiving section 14 is provided as a part which receives sensor signals from the weight detecting sensors 8 through the sensor connecting sections 13. In addition, the signal receiving section 14 associates a sensor signal with the weight detecting sensor 8 in such a way that the data generating section 15 can grasp the sensor signal is output from which weight detecting sensor 8, and has the function to transfer the sensor signal to the data generating section 15.

The data generating section 15 is provided as a part that generates weight detection data, which is necessary for the processing operation of the ECU 3, based on the received sensor signals (The data structure of the weight detection data depends on the ECU 3 and its description is omitted here). The data outputting section 16 is provided as a part that outputs the weight detection data generated in the data generating section 15 to the ECU 3. The data outputting section 16 is connected to the ECU 3 through the corresponding circuit 12.

In the above-mentioned configuration, once the power supplying member 9, into which the seat side ECU functional portion 11 and the FPC 10 are integrated by mounting the seat side ECU functional portion 11 to the FPC 10, is accordingly assembled to the four weight detecting sensors 8 inside the seat 7, the assembly operation related to the seat weight detecting subsystem 4 is completed.

The present invention has a configuration in which the connections related to the four weight detecting sensors 8 and their circuits 12 are aggregated into the FPC 10 of the power supplying member 9 in the structure. Therefore, the working efficiency is improved significantly when compared with the prior art. In addition, since the FPC 10 is included in the structure, the space-saving which relates to wire allotment is obtained. In addition, since the seat side ECU functional portion 11 is mounted to the FPC 10, the working efficiency is improved when compared with assembling them individually. In addition, since the seat side ECU functional portion 11 is mounted to the FPC 10, the number of articles in the assembly of the seat 7 is also reduced when compared with the prior art.

Furthermore, although the main system 1 is a system which relates to the control of an air bag 2 in the above description, it is not limited thereto. For example, it may also be a system that enables the retention of a seat belt to be performed satisfactorily based on the weight of an occupant seated on the seat 7.

Embodiment 2

Figure 3:
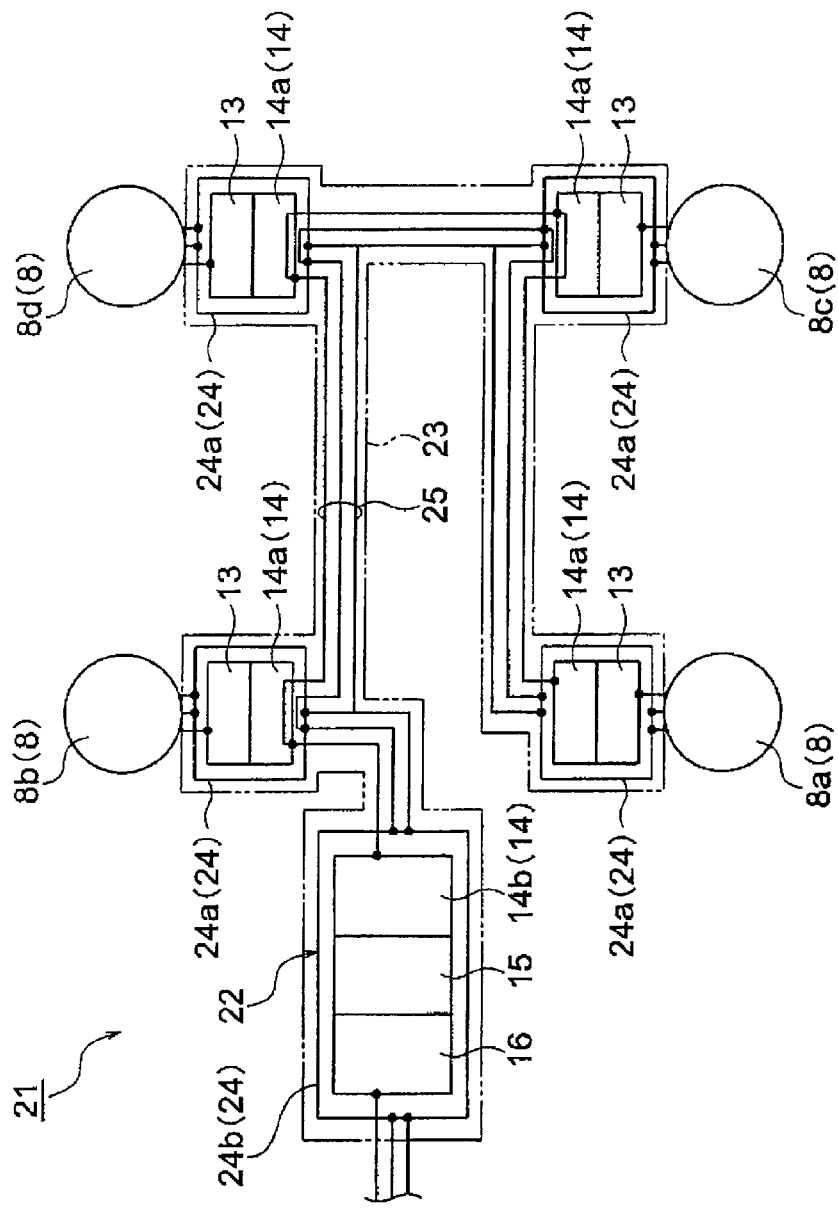
FIG. 3 is a schematic diagram of seat weight detecting subsystems (Embodiment 2).

Below, a second embodiment will be described with reference to the figures. FIG. 3 is a schematic block diagram which shows a seat weight detecting subsystem of the present invention. Furthermore, the components that are identical with those in the above-mentioned first embodiment are illustrated as identical numbers, and their detailed description is omitted.

In FIG. 3, a seat weight detecting subsystem 21 is a system that can be replaced with the seat weight detecting subsystem 4 of Embodiment 1, and includes four weight detecting sensors 8 and a power supplying member 22 which is connected to the weight detecting sensors 8, a power supply 5, an ECU 3, etc (See FIG. 1). The seat weight detecting subsystem 21 is configured to be able to detect the weight of an occupant seated on the seat 7 (See FIG. 1).

The power supplying member 22 includes a FPC 23 and a seat side ECU functional portion 24 which is integrally mounted to the FPC 23. The FPC 23 is a well known member (flexible printed circuit board) that is thin and flexible, and has a circuit which forms common, desired routes (common circuit 25). The FPC 23 is formed as a shape that corresponds to all the four weight detecting sensors 8 (formed so as to correspond to the arrangement of the four weight detecting sensors 8, and have an exactly traversable circuit shape). The common circuit 25 is configured by a power supply line which is connected to the power supply 5 (See FIG. 1), a GND line which is connected to the ground 6 (See FIG. 1), and a signal line (communication line), although they are not given specific numbers. The FPC 23 is formed by aggregating the circuits that relate to the four weight detecting sensors 8 to the common circuit 25.

The seat side ECU functional portion 24, different from Embodiment 1, includes four first ECU functional portions 24a provided accordingly at four weight detecting sensors 8, and a second ECU functional portion 24b which is connected to the four first ECU functional portions 24a through the common circuit 25 in the FPC 23.

The seat side ECU functional portion 24 is configured so as to scatter the functions of the seat side ECU functional portion 11 of Embodiment 1. The first ECU functional portion 24a has a sensor connecting section 13 and a first signal receiving section 14a described later. On the other hand, the second ECU functional portion 24b has a second signal receiving section 14b described later, a data generating section 15, and a data outputting section 16.

The first signal receiving section 14a of the first ECU functional portion 24a and the second signal receiving section 14b of the second ECU functional portion 24b are portions that correspond to the signal receiving section 14 of Embodiment 1. The first signal receiving section 14a and the second signal receiving section 14b associates a sensor signal with the weight detecting sensor 8 in such a way that the data generating section 15 can grasp the sensor signal is output from which weight detecting sensor, and has the function to transfer the sensor signal to the data generating section 15.

In the above-mentioned configuration, once the power supplying member 22, into which the second ECU functional portion 24b, the four first ECU functional portion 24a and the FPC 23 are integrated by mounting the second ECU functional portion 24b and the four first ECU functional portion 24a to the FPC 23, is accordingly assembled to the four weight detecting sensors 8 inside the seat 7 (See FIG. 1), the assembly operation related to the seat weight detecting subsystem 21 is completed.

The present invention has a configuration in which the connections related to the four weight detecting sensors 8 and their circuits are aggregated into the FPC 23 of the power supplying member 22 by using the common circuit 25 in the structure. Therefore, similar to Embodiment 1, the working efficiency is improved significantly when compared with the prior art. In addition, since the FPC 23 is included in the structure, the space-saving which relates to wire allotment is obtained. Further, since the second ECU functional portion 24b and the four first ECU functional portions 24a are mounted to the FPC 23 so that they are integrated, the impact of the component number of the seat side ECU functional portions 24 on the working efficiency is eliminated.

In addition, it is apparent that various modifications can be made to the invention without changing the purpose of the invention.

Furthermore, the invention is not limited to the above description, but it is also possible to integrate the weight detecting sensors 8 and the FPC 10 (FPC 23) by mounting the weight detecting sensors 8 to the FPC 10 (FPC 23).

Although the present invention is described in detail with reference to the embodiments, it is apparent that various modifications and amendments may be made by those skilled in the art without departing from the spirit and scope of the invention.

This application is based on the Japanese patent application (patent application No. 2009-199179) filed on Aug. 31, 2009, the contents of which are incorporated herein by reference.

DESCRIPTION OF THE NUMBERS

1 . . . main system
2 . . . air bag
3 . . . ECU
4 . . . seat weight detecting subsystem
5 . . . power supply
6 . . . ground
7 . . . seat (vehicle seat)
8 . . . weight detecting sensor
9 . . . power supplying member
10 . . . FPC
11 . . . seat side ECU functional portion
12 . . . circuit 13 ... sensor connecting section
14 ... signal receiving section
14a ... first signal receiving section
14b ... second signal receiving section
15 ... data generating section
16 ... data outputting section
21 ... seat weight detecting subsystem
22 ... power supplying member
23 ... FPC
24 ... seat side ECU functional portion
24a ... first ECU functional portion
24b ... second ECU functional portion
25 ... common circuit

The invention claimed is:

1. A seat weight detecting subsystem provided for each seat in a vehicle and for outputting weight detection data which is necessary for a processing operation of an ECU in a main system, the seat weight detecting subsystem comprising:
   a plurality of weight detecting sensors; and
   a power supplying member that is connected to a power supply,
   wherein the power supplying member includes:
      a FPC which has circuits forming desired routes, and is formed so as to have a size which corresponds to at least arrangements of all of the plurality of weight detecting sensors on the seat in the vehicle; and
      a seat side ECU functional portion having:
         sensor connecting sections which serve as connecting portions of the plurality of weight detecting sensors at the corresponding arrangements;
         a signal receiving section which receives sensor signals from the weight detecting sensors through the sensor connecting sections;
         a data generating section which generates the weight detection data based on the received sensor signals; and
         a data outputting section as a portion which outputs the generated weight detection data to the ECU; and
   wherein the seat side ECU functional portion is mounted to a specified position on the circuits of the FPC, and the plurality of weight detecting sensors are arranged in a bus-like arrangement,
   wherein the seat side ECU functional portion includes:
      a plurality of first ECU functional portions provided as many as the number of the plurality of weight detecting sensors; and
      a second ECU functional portion connected to the plurality of first ECU functional portions through a common circuit in the FPC;
   wherein the signal receiving section includes:
      a second signal receiving section provided in the second ECU functional portion; and
      first signal receiving sections which are respectively provided in the plurality of first ECU functional portions and output the received sensor signals to the second signal receiving section through the common circuit while associating the received sensor signals to the weight detecting sensors at the corresponding arrangements;
   wherein the first ECU functional portion includes the sensor connecting sections and the first signal receiving section;
   wherein the second ECU functional portion includes the second signal receiving section, the data generating section and the data outputting section;
   wherein the FPC includes the common circuit;
   wherein the second ECU functional portion is connected to one of the plurality of first ECU functional portions through first electric lines, and the one of the plurality of first ECU functional portions is connected to the other of the plurality of first ECU functional portions (24a) through second electric lines; and
   wherein the first electric lines and the second electric lines are the same signal traces.

2. The seat weight detecting subsystem according to claim 1, wherein
   the FPC is formed by aggregating the circuits that relate to the plurality of weight detecting sensors to the shared circuit.

3. The seat weight detecting subsystem according to claim 1, wherein
   the shared circuit is configured by a power supply line which is connected to the power supply, a GND line which is connected to the ground, and a signal line.

* * * * *